US009265278B2

United States Patent
Pellaud et al.

(10) Patent No.: US 9,265,278 B2
(45) Date of Patent: *Feb. 23, 2016

(54) METHODS FOR DECARBONATING FERMENTED LIQUIDS

(71) Applicant: ANHEUSER-BUSCH, LLC, St. Louis, MO (US)

(72) Inventors: Jerome Pellaud, New Rochelle, NY (US); Patrick O'Riordan, South Melbourne (AU); Neeraj Sharma, Crystal Lake, IL (US); Frank Z. Hellwig, New York, NY (US); Wilfried Lossignol, Bossut (BE); Aaron Penn, Brooklyn, NY (US)

(73) Assignee: Anheuser-Busch, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,672

(22) Filed: Jun. 24, 2013

(65) Prior Publication Data

US 2014/0377429 A1 Dec. 25, 2014

(51) Int. Cl.
*A23L 2/76* (2006.01)
*C12C 11/11* (2006.01)
*C12C 12/00* (2006.01)

(52) U.S. Cl.
CPC . *A23L 2/76* (2013.01); *C12C 11/11* (2013.01); *C12C 12/00* (2013.01)

(58) Field of Classification Search
CPC ............ C12C 11/11; C12C 12/00; A23L 2/76
USPC .................................................. 426/492, 493
See application file for complete search history.

(56) References Cited

U.S. PATENT DOCUMENTS

| | | | | |
|---|---|---|---|---|
| 1,832,587 A | * | 11/1931 | Schneible | ...................... 426/493 |
| 4,636,337 A | | 1/1987 | Gupta et al. | |
| 4,947,739 A | | 8/1990 | Owen | |
| 5,384,135 A | * | 1/1995 | Caluwaerts | ...................... 426/14 |
| 5,460,846 A | | 10/1995 | Stumphauzer et al. | |

(Continued)

FOREIGN PATENT DOCUMENTS

| | | |
|---|---|---|
| CA | 2264969 | 9/2000 |
| DE | 202007007045 | 10/2008 |

(Continued)

OTHER PUBLICATIONS

Manning, Brewing Techniques: Understanding Specific Gravity and Extract, 1993, available from http://morebeer.com/brewingtechniques/library/backissues/issue1.3/manning.hmtl.

(Continued)

*Primary Examiner* — Anthony Weier
(74) *Attorney, Agent, or Firm* — Holland & Hart LLP (57) ABSTRACT

A method of decarbonating fermented liquids in-line may include directing a carbonated malt-based liquid through a nozzle, and directing the carbonated malt-based liquid from the nozzle into a space maintained at a partial vacuum pressure. The method may further include maintaining the carbonated malt-based beverage in the space until substantially all of the carbon dioxide dissolved within the carbonated malt-based beverage has been removed to provide a non-carbonated liquid, and removing the non-carbonated liquid from the space at substantially the same rate that the carbonated malt-based liquid is directed into the space.

22 Claims, 4 Drawing Sheets

(56) References Cited

U.S. PATENT DOCUMENTS

| | | |
|---|---|---|
| 5,501,375 A | 3/1996 | Nilson |
| 5,565,149 A * | 10/1996 | Page et al. .................. 261/140.1 |
| 5,618,572 A | 4/1997 | Tripp et al. |
| 7,008,652 B2 | 3/2006 | Effler |
| 7,935,400 B2 | 5/2011 | Toft |
| 2002/0094942 A1 | 7/2002 | Danneels |
| 2004/0142067 A1* | 7/2004 | Le Clerc et al. ................ 426/17 |
| 2007/0172615 A1 | 7/2007 | Darr et al. |
| 2007/0211967 A1 | 9/2007 | Murray |
| 2007/0248719 A1* | 10/2007 | Koch et al. ...................... 426/11 |
| 2010/0028515 A1 | 2/2010 | Gormley |
| 2010/0112255 A1 | 5/2010 | Fayet |
| 2010/0221404 A1 | 9/2010 | Little |
| 2011/0000812 A1 | 1/2011 | Laupie |
| 2011/0027428 A1 | 2/2011 | Bekele |
| 2011/0147406 A1 | 6/2011 | Grill |
| 2012/0107455 A1 | 5/2012 | Briggs |
| 2012/0167991 A1 | 7/2012 | Feilner |
| 2015/0064325 A1* | 3/2015 | Pellaud .................. C12C 5/026 426/487 |

FOREIGN PATENT DOCUMENTS

| | | |
|---|---|---|
| JP | 2007312673 | 12/2007 |
| WO | 0023357 | 4/2000 |
| WO | 02044058 | 6/2002 |
| WO | 2007032719 | 3/2007 |

OTHER PUBLICATIONS

English translation of DE202007007045. Oct. 23, 2008.

English abstract and English machine translation of the specification and claims of JP2007312673. Dec. 6, 2007.

Erowid, Beer Alcohol and Calories (2000), obtained May 29, 2015 from https://www.erowid.org/chemicals/alcohol/alcohol_info1.shtml.

Brewer's Friend: Beer Styles—IBU Chart Graph (Bitterness Range (2009), obtained May 29, 2015 from http://www.brewersfriend.com/2009/01/24/beer-styles-ibu-chart-graph-bitterness-range/.

* cited by examiner

METHODS FOR DECARBONATING FERMENTED LIQUIDS

TECHNICAL FIELD

In general, the present disclosure relates to personalized beverages. More specifically, the present disclosure relates to fermented beverages, such as malt-based beverages, that may be personalized to a consumer's preference, such as by combining ingredients together.

BACKGROUND

In recent years, malt-based beverages, and especially beers, are a fast growing market in many countries such as China and India. In many commercial establishments, these malt-based beverages are dispensed from large commercial dispensing taps. However, such systems are not logical for adaptation for wide personal use. Rather, personal servings of malt-based beverages are independently packaged for transport and sale. However, the preparation and transportation of personal malt or cereal based beverages has come at great expense. Due to their nature, malt or cereal based beverages have traditionally been carbonated at their source and then transported to their end destination in amber or otherwise dark colored glass bottles or aluminum cans. Dark colored glass bottles and aluminum cans have been the traditional containers for the storage and transportation of malt or cereal based beverages because they provide secure containment of the carbonated liquid without the release of unacceptable levels of carbon dioxide during storage. Additionally, dark colored bottles and aluminum cans are configured to prevent the exposure of the malt or cereal based beverage to the degrading effects of ultraviolet (UV) radiation from the sun or other light sources.

Traditional bottles and aluminum cans have also been designed to have generally cylindrical shapes due to the ease of manufacturing such shapes. However, the generally cylindrical shape of glass bottles and aluminum cans are inefficient for storage and transport. Cylindrical shapes are unable to be efficiently stacked for transport or storage without a large amount of wasted space between the cylindrical shapes. Furthermore, cylindrical shapes can typically only be stacked in a single vertical layer without becoming unstable for transportation. Consequently, square or rectangular structural containers and large amounts of packaging material are typically used for the transportation and stabilization of multiple cylindrical containers.

A need exists for a container that can be used for the efficient storage and transport of cereal or malt based personal beverages.

SUMMARY

In one aspect of the present disclosure, a method of decarbonating fermented liquids in-line may comprise directing a carbonated malt-based liquid through a nozzle, and directing the carbonated malt-based liquid from the nozzle into a space maintained at a partial vacuum pressure. The method may further comprise maintaining the carbonated malt-based beverage in the space until substantially all of the carbon dioxide dissolved within the carbonated malt-based beverage has been removed to provide a non-carbonated liquid, and removing the non-carbonated liquid from the space at substantially the same rate that the carbonated malt-based liquid is directed into the space.

In a further aspect, which may be combined with any other aspects, directing the carbonated malt-based liquid from the nozzle into the space may comprises distributing the carbonated malt-based liquid over a surface.

In a further aspect, which may be combined with any other aspects, directing the carbonated malt-based liquid over the surface may comprise directing the carbonated malt-based liquid over a wall of a cylindrical vessel defining the space.

In a further aspect, which may be combined with any other aspects, the method may further comprise heating the carbonated malt-based liquid.

In a further aspect, which may be combined with any other aspects, heating the carbonated malt-based liquid may comprise heating the carbonated malt-based beverage to a temperature between about 35° C. and about 38° C.

In a further aspect, which may be combined with any other aspects, the space may be maintained at an absolute pressure of about 10 kPa.

In a further aspect, which may be combined with any other aspects, the carbonated malt-based liquid may comprise an ethyl alcohol content of at least 0.1% wt.

In a further aspect, which may be combined with any other aspects, the carbonated malt-based liquid may comprise an ethyl alcohol content of at least 0.5% wt.

In a further aspect, which may be combined with any other aspects, the carbonated malt-based liquid may comprise an ethyl alcohol content of at least 1% wt.

In a further aspect, which may be combined with any other aspects, the carbonated malt-based liquid may comprise an ethyl alcohol content between about 3% wt and about 12% wt.

In a further aspect, which may be combined with any other aspects, the carbonated malt-based beverage may comprise between about 3% wt malt extract solids and about 5.5% wt malt extract solids.

In a further aspect, which may be combined with any other aspects, the carbonated malt-based beverage may comprise less than about 6 International Bitterness Units.

In a further aspect, which may be combined with any other aspects, the carbonated malt-based beverage may comprise less than about 3 International Bitterness Units.

In a further aspect, which may be combined with any other aspects, the carbonated malt-based beverage may comprise about zero International Bitterness Units.

In a further aspect, which may be combined with any other aspects, the non-carbonated liquid removed from the space may comprise a carbon dioxide level between about zero grams per liter and about 1.5 grams per liter.

In one aspect of the present disclosure, a method of decarbonating fermented liquids in-line may comprise heating a carbonated malt-based liquid, directing a carbonated malt-based liquid through a nozzle, and distributing the carbonated malt-based liquid over a surface within a space with the nozzle. The method may further comprise maintaining the space at a partial vacuum pressure, maintaining the carbonated malt-based beverage in the space until substantially all of the carbon dioxide dissolved within the carbonated malt-based beverage has been removed to provide a non-carbonated liquid, and removing the non-carbonated liquid from the space at substantially the same rate that the carbonated malt-based liquid is directed into the space.

In a further aspect, which may be combined with any other aspects, heating the carbonated malt-based liquid may comprise heating the carbonated malt-based beverage to a temperature between about 35° C. and about 38° C.

In a further aspect, which may be combined with any other aspects, the non-carbonated liquid removed from the space may comprise a carbon dioxide level between about zero grams per liter and about 1.5 grams per liter.

In a further aspect, which may be combined with any other aspects, the carbonated malt-based liquid may comprise an ethyl alcohol content between about 3% wt and about 12% wt, and may comprise between about 3% wt malt extract solids and about 5.5% wt malt extract solids.

In a further aspect, which may be combined with any other aspects, the carbonated malt-based beverage may comprise less than about 6 International Bitterness Units.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

Embodiments described herein provide devices, systems and methods for the storage and transport of personal fermented beverages, such as fermented malt-based beverages. In the present disclosure, it should be understood that the present system will be described with reference to malt-based beverages. However, the present systems and methods equally apply to all cereal and pseudo-cereal based beverages, including, but in no way limited to beverages based on maize, rice, wheat, barley, sorghum, millet, oats, triticale, rye, buckwheat, fonio, and quinoa. In some embodiments, at least one base liquid may be manufactured that includes water and ethyl alcohol, and other ingredients derived from the brewing and fermentation of sugars, such as sugars extracted from malted grain, and may, according to various embodiments, include any number of flavors. The base liquid may be decarbonated after fermentation, to provide a still base liquid. The still base liquid, which may be substantially free of carbon dioxide or other dissolved gasses, may then be packaged, such as in a carton. The base liquid may then be shipped and sold to consumers, where it may be combined with carbon dioxide and otherwise prepared for consumption.

Figure 1:
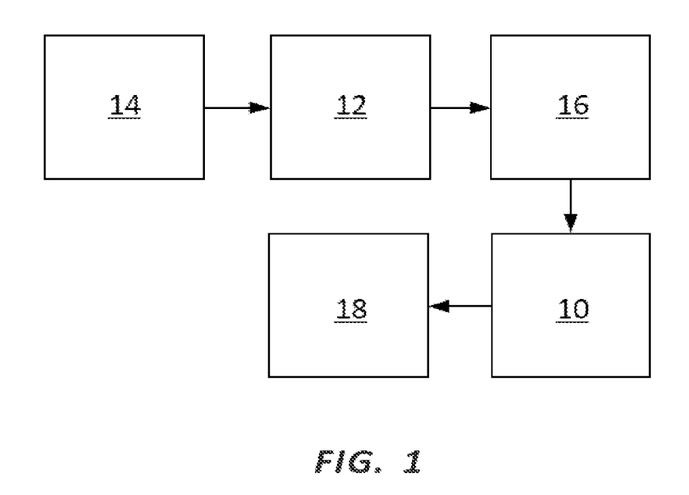
FIG. 1 is a schematic process diagram depicting stages of the manufacture process for a base liquid for making a personalized malt-based beverage, according to an embodiment of the present disclosure.

In some embodiments, a base liquid 10 for making a personalized fermented beverage may be manufactured by fermenting a wort 12 comprising fermentable sugars and water, as illustrated in FIG. 1. The fermentable sugars may be obtained by mashing a carbohydrate source 14 (i.e., utilizing enzymes to convert complex sugars to simple, fermentable sugars), such as malted barley and/or adjuncts such as one or more of maize, corn, rye, wheat, oat, rice, millet, sorghum, cassava root, potato, yam, agave, and persimmon. After mashing, liquid wort 12 may be separated from solids (e.g., grain husks) from the carbohydrate source by lautering. Optionally, fermentable sugars may be added to the wort 12 that do not require mashing, such as one or more of honey, cane sugar, beet sugar, molasses, fruit sugar (fructose), agave syrup, maple syrup, and corn sugar.

Various base liquids 10 may be prepared by utilizing different ingredients for preparing the wort 12. Ingredients may be selected to provide a desired color, a desired ethyl alcohol content, and desired flavor profiles. For example, a roasted barley malt (e.g., black patent malt and/or chocolate malt) may be added to provide a dark base liquid 10. For another example, adjuncts such as rice sugar, corn sugar, and/or cane sugar may be added to provide additional ethyl alcohol in a base liquid without adding significant flavor or color, such as for a light colored base liquid 10. In yet another example, wheat may be added to provide a wheat base liquid 10.

The wort 12 may then be boiled, and optionally, a small amount of bittering agents, such as hops or hops derivatives, may be added prior to or during the boiling process. In some embodiments, no bittering agents may be added. For example, the wort 12, and the resulting base liquid 10, may include less than about 6 International Bitterness Units (IBUs) (i.e., having less than about 6 milligrams of isomerized alpha acid per one liter of liquid). In another example, the wort 12, and the resulting base liquid 10, may include less than about 3 IBUs. In yet another example, the wort 12, and the resulting base liquid 10, may include about zero IBUs.

After boiling, the wort 12 may be cooled and yeast may be added to ferment the wort 12 (e.g., to convert the fermentable sugars in the wort 12 to ethyl alcohol and carbon dioxide). The yeast and fermentation process may be selected to affect the flavor of the resulting base liquid 10. For example, a top fermenting yeast (i.e., an ale yeast) may be selected and fermenting temperatures may be relatively warm (e.g., between about 13° C. and about 24° C.) to provide a base liquid 10 having flavors of an ale style beer. For another example, a bottom fermenting yeast (i.e., a lager yeast) may be selected and fermenting temperatures may be relatively cool (e.g., between about 0° C. and about 13° C.) to provide a base liquid 10 having flavors of a lager style beer. In yet another example, a bottom fermenting yeast (i.e., a lager yeast) may be selected and fermenting temperatures may be relatively warm (e.g., between about 13° C. and about 24° C.) to provide a base liquid 10 having flavors of a steam style beer.

When the fermentation process has completed, a carbonated base liquid 16 may result that comprises an ethyl alcohol level of at least 0.1% wt and dissolved carbon dioxide produced by the yeast during fermentation. In some embodiments the base liquid 10 may comprise an ethyl alcohol level of at least 0.5% wt. In further embodiments, the base liquid 10 may comprise an ethyl alcohol level of at least 1% wt. For example, the base liquid 10 may comprise an ethyl alcohol level between about 3% wt and about 12% wt.

Bittering ingredients may, according to one exemplary embodiment, be included in the base liquid. Such bittering ingredients may include one or more of hops, dandelion, pine, spruce, nettle, scotch broom, heather, and other bittering ingredients. Likewise, aromatic ingredients may be used to flavor the base liquid. Such aromatic ingredients may include one or more of hops; citrus peel; coffee; tea; oak; charred wood; spices such as cinnamon, coriander, and curacao; fruits such as cherry, raspberry, peach, apple, and apricots; vegetables such as pumpkin, and blue agave nectar; and cereals such as malted barley, rye, wheat, rice, and millet.

Prior to packaging, the carbonated base liquid 16 may be decarbonated by known methods, or new methods, to remove substantially all of the dissolved carbon dioxide gas, and any other gases, to provide the base liquid 10. For example, after decarbonation the base liquid 10 may have a carbon dioxide level between about zero grams per liter and about 1.5 grams per liter. According to one embodiment, after decarbonation, the base liquid 10 may have a carbon dioxide level between about zero grams per liter and about 1.0 grams per liter. According to yet another embodiment, after decarbonation, the base liquid 10 may have a carbon dioxide level between about zero grams per liter and about 0.6 grams per liter. Additionally, after fermentation, and prior to packaging, the base liquid 10 may be filtered to remove a portion of the solids.

Optionally, a carbonated liquid base 16 may be transported in bulk, such as by a tanker truck, from a brewery to a separate packaging plant. The carbonated base liquid 16 may then be decarbonated and packaged into individual containers, such as cartons, at the packaging plant to provide an individually packaged base liquid 18. The generation of multiple decarbonated base liquids allows the consumer to select from a number of individually packaged base liquids 18 in varying levels of alcohol content, flavor, and bitterness level, to allow for consumer preferences.

Figure 8:
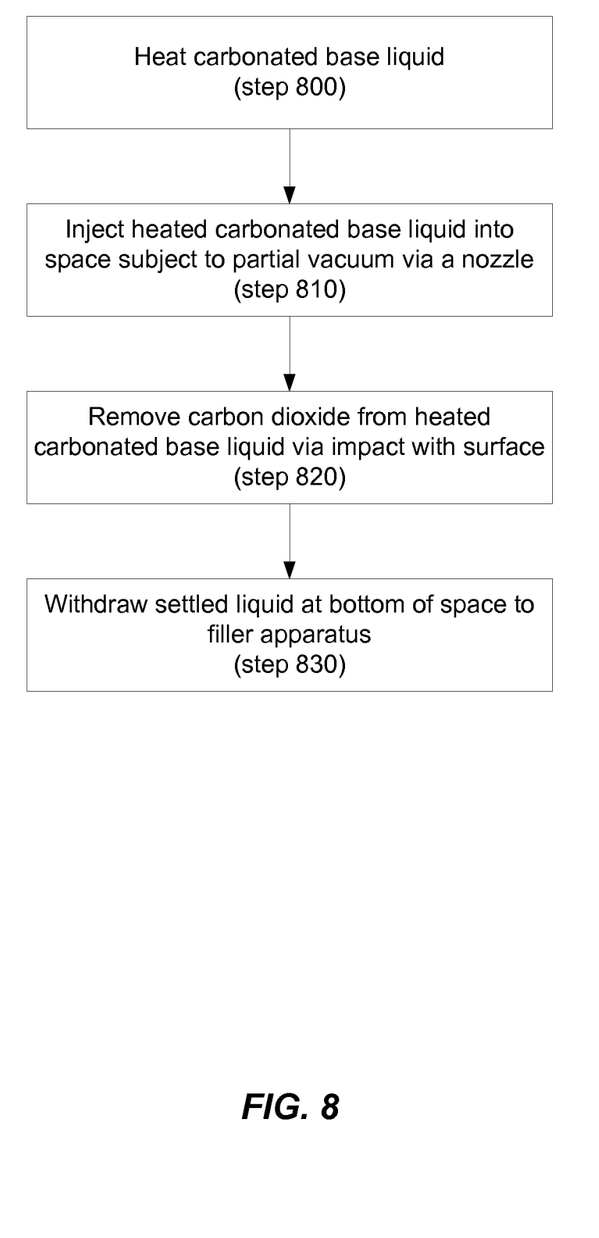
FIG. 8 is a flow chart detailing a process for in-line decarbonation of fermented liquids, according to one exemplary embodiment.

In some embodiments, the carbonated base liquid 16 may be decarbonated inline prior to packaging, as illustrated in FIG. 8. The inline decarbonation may be conducted within a space, such as a cylindrical chamber, that may be subjected to a partial vacuum. Prior to being introduced into the space, the carbonated base liquid 16 may be heated (step 800), such as to a temperature between about 35° C. and about 38° C. The space may be maintained at a partial vacuum pressure, such as an absolute pressure of about 10 kPa.

The heated, carbonated base liquid 16 may be injected onto the space (step 810) via a nozzle, which may distribute the base liquid over a surface within the space, such as a wall defining the space. Alternatively, any number of specially shaped objects having any number of varying cross-sectional profiles may be included in the space to receive the heated, carbonated base liquid 16 as it is injected into the space to create sufficient agitation that the carbon dioxide is remove from the liquid. Within the space, the heat and vacuum conditions, along with the optional impact with a surface, may cause the carbon dioxide dissolved within the carbonated base liquid 16 to separate from the liquid and be withdrawn from the space. After the carbon dioxide has been substantially removed from the carbonated base liquid 16 to form the base liquid 10 (step 820), the base liquid 10 may settle at the bottom of the space and be withdrawn from the space to a filler apparatus (step 830), such as those known in the art, for packaging to provide the packaged base liquid 18.

Figure 2:
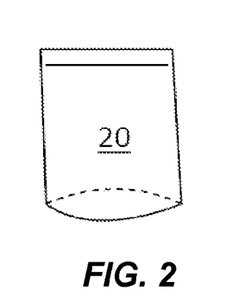
FIG. 2 is a front perspective view of a non-rigid gusseted retort package containing a base liquid, according to one embodiment of the present disclosure.
Figure 3A:
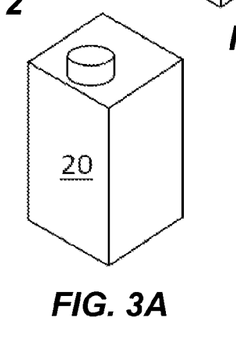
FIGS. 3A and 3B are perspective views of exemplary containers, according to various embodiments of the present disclosure.
Figure 3B:
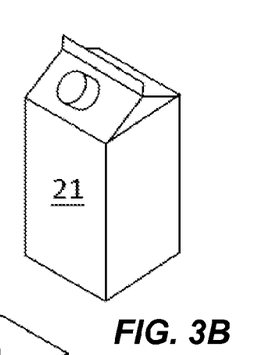

As the base liquid 18 is substantially free of carbonation (i.e., dissolved gases), the individual containers utilized for the packaged base liquid 18 may be non-rigid (e.g., soft-sided or flexible) containers, and the base liquid 18 may be hermetically sealed within an orifice defined by a non-rigid wall of the container. In some embodiments, a non-rigid container may be formed from a flexible sheet material, which may comprise one or more of paper pulp, a polymer, and/or a metal foil. For example, a non-rigid container may be comprised of a flexible sheet material comprising a multi-layer laminate having a first polyethylene layer, a paper layer, a second polyethylene layer, an aluminum foil layer, a polyethylene adhesion layer, and a third polyethylene layer. Accordingly, although a non-rigid container may be suitable for a liquid that is substantially free of any dissolved gases, non-rigid containers may not be suitable for carbonated liquids, as the flexible sides of a non-rigid container may not provide support for a pressure difference between the content therein and the ambient environment. The non-rigid containers 19, 20, 21 may be configured to hold between about 0.5 liter and about 10 liters. For example, the individual containers may be foil-on-foil, gusseted retort packages 19, as shown in FIG. 2, having a gusseted base configured to facilitate a vertical orientation of the gusseted retort packages 19. For another example, the individual containers may be an aseptic composite material carton 20, such as the Tetra Gemina Aseptic® available from Tetra Pak Inc. of Vernon Hills, Ill., USA, as shown in FIG. 3A. For a further example, the individual containers may be a carton 21 with a gusseted top, such as the Tetra Rex® available from Tetra Pak Inc. of Vernon Hills, Ill., USA, as shown in FIG. 3B. Any number of flexible materials configured to hermetically store a liquid, including polymers, may be used to form the individual containers of the present exemplary system and method.

Figure 4:
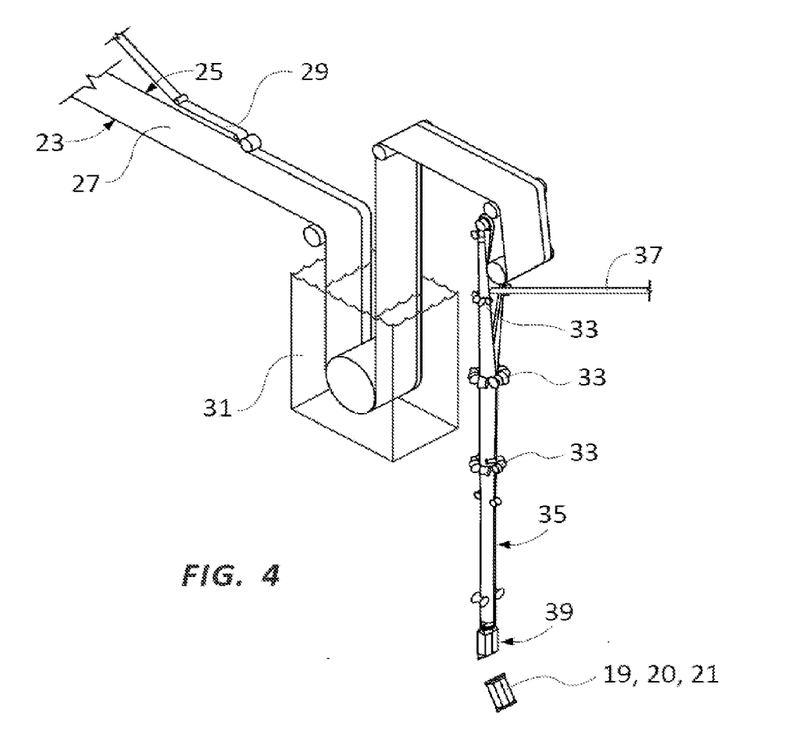
FIG. 4 is an isometric view of a processing line for manufacturing non-rigid packages containing a base liquid, such as may be made by the process of FIG. 1.

An example of a portion of a process for forming non-rigid containers 19, 20, 21 from sheet material is illustrated in FIG. 4. A flexible sheet material 23 may be provided, such as from a roll, the flexible sheet material 23 having a first edge 25 and an opposing second edge 27. A sealing strip 29 may also be provided, such as from a roll. The sealing strip 29 may then be adhered to the first edge 25 of the flexible sheet material 23, so that it extends over the first edge 25. The flexible sheet material 23 with the sealing strip 29 adhered thereto may be sanitized in a chemical bath, such as a hydrogen peroxide bath 31.

Figure 5:
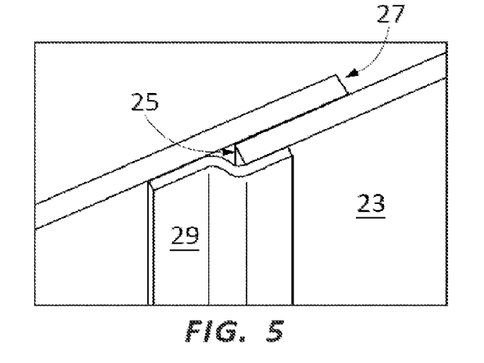
FIG. 5 is a detail view of a non-rigid package manufactured, such as made on the processing line of FIG. 4.

The flexible sheet material 23 may then be creased and folded with progressive roller units 33 to form a tube 35. According to one exemplary embodiment, the tube 35 may have any number of cross-sectional shapes including, but in no way limited to, circular, oval, square, rectangular, or triangular cross-section. To form the tube 35, the first and second edges 25 and 27 of the sheet material 23 may be positioned to overlap and be secured together with an adhesive. Additionally, the portion of the sealing strip 29 that overhangs the first edge 25 may be adhered to the sheet material 23 proximate to the second edge 27, to provide a longitudinal or transverse seal along the seam within the interior of the tube 35 (and thus within the interior of the resulting non-rigid containers 19, 20, 21), as shown in FIG. 5.

Referring again to FIG. 4, the tube may then be filled with base liquid 10 via a delivery tube 37 prior to segments of the tube 35 being sealed to form package precursors 39, which are then cut from the tube 35 to provide discrete non-rigid containers 19, 20, 21 of packaged base liquid 18.

Figure 6:
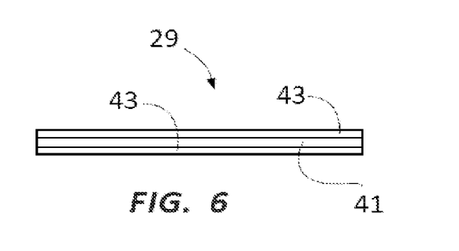
FIG. 6 is a cross-sectional detail view of a sealing strip for use in non-rigid packages, such as shown in FIG. 5.

To maintain freshness of the packaged base liquid 18, the sealing strip 29 that provides the longitudinal transverse seal of the non-rigid container 19, 20, 21 may include a material layer that provides an oxygen barrier. In some embodiments, the sealing strip 29 may comprise a layer of ethylene vinyl alcohol (EVOH). For example, as shown in FIG. 6, the sealing strip 29 may comprise a plurality of layers and may comprise a layer 41 of EVOH sandwiched between layers 43 of polyethylene terephthalate (PET). Alternatively, the sealing strip 29 may be formed of a laminate that includes any number of polymer layers, including, but in no way limited to nylon, to increase the hermetic seal of the resulting non-rigid container 19, 20, 21.

Figure 7:
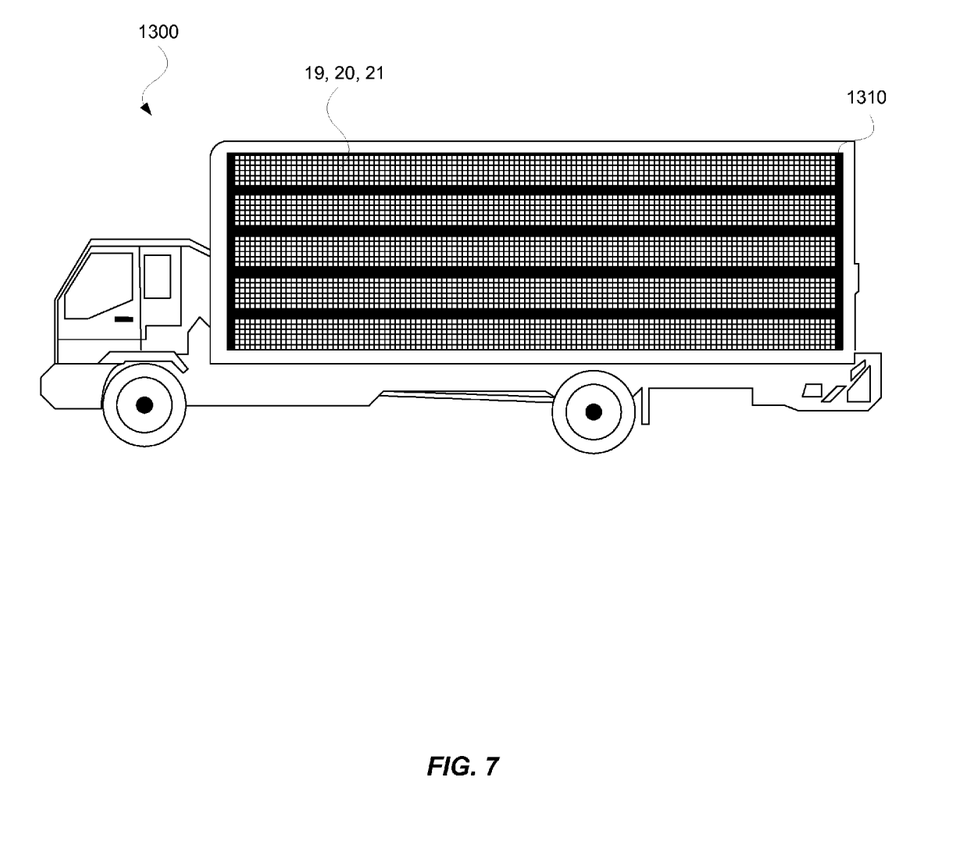
FIG. 7 is a side cross-sectional view of a shipping vehicle containing a number of non-rigid packages of decarbonated beer base efficiently stacked, according to an embodiment of the present disclosure.

The use of non-rigid containers 19, 20, 21 may facilitate cost effective shipping of the packaged base liquid 18. Non-rigid containers 19, 20, 21 may be relatively light weight, may be configured to stack efficiently, reducing dead space between packages, and may be allow relatively rough handling. For example, the packages may be stacked in a geometrically efficient manner based on a flat-sided geometry, and such stacked packages may be efficiently shipped. According to one exemplary embodiment, packages having a square or rectangular cross-section may be stacked with adjacent flat sides touching, thereby eliminating unused volumes in transportation containers. FIG. 7 illustrates a transportation truck 1300 having a number of non-rigid containers 19, 20, 21 having a rectangular cross-section, stacked in an efficient manner. As illustrated in FIG. 7, each non-rigid container 19, 20, 21, with the exception of the edge containers, is stacked with a container immediately above, below, to the left, and to the right. This efficient stacking system, mating adjacent planar surfaces, allows for the shipment of the maximum volume of product. In contrast, traditional containers used for carbonated alcoholic beverages were cylindrically shaped, resulting in a high level of unused space when shipped. As further illustrated in FIG. 7, a number of structural stacking dividers 1310 are included between multiple layers of flexible containers 19, 20, 21 to ensure that the maximum compression levels of the flexible containers is not exceeded by the bottom container supporting all containers resting thereon.

Non-rigid containers 19, 20, 21 may also facilitate reliability and quality of the product received by an end consumer. Non-rigid containers 19, 20, 21 may facilitate the pasteurization, or ultra-pasteurization, of the packaged base liquid 18 after packaging. This may eliminate the possibility of the packaged base liquid 18 from being contaminated with microorganisms. Non-rigid containers 19, 20, 21 may additionally facilitate the inclusion of labels and information directly on the package, which may be aesthetically pleasing to an end consumer. Furthermore, non-rigid containers 19, 20, 21 may be environmentally friendly. Although there are many advantages to utilizing non-rigid containers 19, 20, 21, rigid containers, such as bottles and cans comprised of one or more of plastic, glass, and metal, may also be utilized.

In some embodiments, the packaged base liquid 18 may have a composition comprising a water content between about 89% wt and about 94% wt, a malt extract solids (e.g., beer flavor) content between about 3% wt and about 5.5% wt, a carbon dioxide content less that about 0.15% wt, and an ethyl alcohol content between about 0.1% wt and about 8% wt. Alternatively, according to one exemplary embodiment, the packaged base liquid 18 may have an apparent extract between −1 Degree Plato to 8 Degree Plato, with at least 50% coming from cereal. Additionally, as previously discussed herein, the base liquid 10 or the packaged base liquid 18 may be pasteurized, or ultra-pasteurized, to deactivate or kill any remaining yeast and/or other microorganisms therein.

Once the base liquid 10 is delivered to the consumer, it may be carbonated via any number of methods known in the art including, but in no way limited to a streamed or forced dissolution of carbon dioxide, nitrogen, and/or other gases into the base liquid. The preceding description has been presented only to illustrate and describe exemplary embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A method of decarbonating fermented liquids in-line, the method comprising:
    directing a carbonated cereal-based liquid through a nozzle;
    directing the carbonated cereal-based liquid from the nozzle into a space; and
    maintaining the carbonated cereal-based liquid in the space until substantially all of the carbon dioxide dissolved within the carbonated cereal-based liquid has been removed to provide a non-carbonated liquid; and
    removing the non-carbonated liquid from the space to a filler apparatus to package the non-carbonated liquid in at least one container.

2. The method of claim 1, wherein said cereal-based liquid comprises a malt-based liquid.

3. The method of claim 1, further comprising maintaining said space at a partial vacuum pressure.

4. The method of claim 1, further comprising removing the non-carbonated liquid from the space at substantially the same rate that the carbonated cereal-based liquid is directed into the space.

5. The method of claim 1, wherein directing the carbonated cereal-based liquid from the nozzle into the space comprises distributing the carbonated cereal-based liquid over a surface.

6. The method of claim 5, wherein directing the carbonated cereal-based liquid over the surface comprises directing the carbonated cereal-based liquid over a wall of a cylindrical vessel defining the space.

7. The method of claim 1, further comprising heating the carbonated cereal-based liquid.

8. The method of claim 7, wherein heating the carbonated cereal-based liquid comprises heating the carbonated cereal-based liquid to a temperature between about 35° C. and about 38° C.

9. The method of claim 3, wherein the space is maintained at an absolute pressure of about 10 kPa.

10. The method of claim 1, wherein the carbonated cereal-based liquid comprises an ethyl alcohol content of at least 0.1% wt.

11. The method of claim 10, wherein the carbonated cereal-based liquid comprises an ethyl alcohol content of at least 0.5% wt.

12. The method of claim 11, wherein the carbonated cereal-based liquid comprises an ethyl alcohol content of at least 1% wt.

13. The method of claim 12, wherein the carbonated cereal-based liquid comprises an ethyl alcohol content between about 3% wt and about 12% wt.

14. The method of claim 1, wherein the carbonated cereal-based liquid comprises between about 3% wt malt extract solids and about 5.5% wt malt extract solids.

15. The method of claim 1, wherein the carbonated cereal-based liquid comprises less than about 6 International Bitterness Units.

16. The method of claim 15, wherein the carbonated cereal-based liquid comprises less than about 3 International Bitterness Units.

17. The method of claim 16, wherein the carbonated cereal-based liquid comprises about zero International Bitterness Units.

18. A method of decarbonating fermented liquids in-line, the method comprising:
    heating a carbonated malt-based liquid;
    directing a carbonated malt-based liquid through a nozzle;

distributing the carbonated malt-based liquid over a surface within a space with the nozzle;

maintaining the space at a partial vacuum pressure;

maintaining the carbonated malt-based liquid in the space until substantially all of the carbon dioxide dissolved within the carbonated malt-based liquid has been removed to provide a non-carbonated liquid; and removing the non-carbonated liquid from the space to a filler apparatus at substantially the same rate that the carbonated malt-based liquid is directed into the space where the non-carbonated liquid is packaged in at least one container.

19. The method of claim 18, wherein heating the carbonated malt-based liquid comprises heating the carbonated malt-based liquid to a temperature between about 35° C. and about 38° C.

20. The method of claim 18, wherein the non-carbonated liquid removed from the space comprises a carbon dioxide level between about zero grams per liter and about 1.5 grams per liter.

21. The method of claim 18, wherein the carbonated malt-based liquid comprises an ethyl alcohol content between about 3% wt and about 12% wt, and comprises between about 3% wt malt extract solids and about 5.5% wt malt extract solids.

22. The method of claim 18, wherein the carbonated malt-based liquid comprises less than about 6 International Bitterness Units.

* * * * *